(12) United States Patent
Okamura et al.

(10) Patent No.: US 10,017,327 B2
(45) Date of Patent: Jul. 10, 2018

(54) CONVEYING EQUIPMENT WITH UTILIZATION OF CONVEYING TRAVELING BODY

(71) Applicant: Daifuku Co., Ltd., Osaka (JP)

(72) Inventors: Takashi Okamura, Shiga (JP); Yasuhiro Yamauchi, Shiga (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 15/467,508

(22) Filed: Mar. 23, 2017

(65) Prior Publication Data
US 2017/0313521 A1 Nov. 2, 2017

(30) Foreign Application Priority Data

Apr. 29, 2016 (JP) ................................. 2016-092150

(51) Int. Cl.
*B65G 35/06* (2006.01)
*B65G 17/12* (2006.01)
*B65G 23/00* (2006.01)
*B65G 39/20* (2006.01)
*B65G 47/88* (2006.01)
*B61B 13/12* (2006.01)

(52) U.S. Cl.
CPC ............ *B65G 35/06* (2013.01); *B61B 13/127* (2013.01); *B65G 17/12* (2013.01); *B65G 23/00* (2013.01); *B65G 39/20* (2013.01); *B65G 47/8861* (2013.01)

(58) Field of Classification Search
CPC ......... B65G 39/20; B65G 17/12; B65G 35/06
See application file for complete search history.

(56) References Cited

U.S. PATENT DOCUMENTS

| 5,067,413 | A | * | 11/1991 | Kiuchi | B61B 13/127 104/168 |
|---|---|---|---|---|---|
| 6,814,218 | B2 | * | 11/2004 | Nishihara | B65G 35/06 198/370.04 |
| 7,171,906 | B2 | * | 2/2007 | Tada | B61B 13/127 104/165 |
| 7,484,616 | B2 | * | 2/2009 | Nakamura | B61B 10/02 104/172.2 |
| 7,611,007 | B2 | * | 11/2009 | Lim | B65G 17/066 198/850 |
| 7,658,275 | B2 | * | 2/2010 | Hayashi | B61B 13/127 198/459.1 |

(Continued)

FOREIGN PATENT DOCUMENTS

JP 2004331245 A 11/2004
JP 4052173 B2 * 2/2008 ............. B65G 35/06

*Primary Examiner* — Thomas Randazzo
(74) *Attorney, Agent, or Firm* — St. Onge Steward Johnston & Reens LLC

(57) ABSTRACT

Conveying equipment with utilization of a conveying traveling body includes a conveying traveling body which includes a plurality of trolleys in a traveling direction and a load bar connecting these trolleys and a friction drive section which is provided in the traveling path of the conveying traveling body. The load bar is provided immediately below a pair of left and right guide rails for supporting and guiding the conveying traveling body, and a friction drive wheel which is pressure-contacted with a side surface of the load bar to propel the conveying traveling body in the friction drive section is arranged below the guide rails.

8 Claims, 9 Drawing Sheets

(56) References Cited

U.S. PATENT DOCUMENTS

| | | | |
|---|---|---|---|
| 7,694,803 B1* | 4/2010 | Call | B65G 39/20 |
| | | | 104/172.5 |
| 7,721,871 B2* | 5/2010 | Takano | B61B 13/127 |
| | | | 198/346.2 |
| 7,798,068 B2* | 9/2010 | Nishihara | B61B 3/02 |
| | | | 104/172.4 |
| 8,408,381 B2* | 4/2013 | Murakami | B65G 35/06 |
| | | | 198/465.1 |
| 8,602,203 B2* | 12/2013 | Nishihara | B65G 35/066 |
| | | | 104/172.3 |
| 8,978,874 B2* | 3/2015 | Ooe | B65G 35/06 |
| | | | 198/465.1 |
| 9,463,932 B2* | 10/2016 | Nakamura | B61B 13/125 |
| 9,630,634 B2* | 4/2017 | Nakamura | B61B 13/125 |
| 2017/0022014 A1* | 1/2017 | Shiki | B61B 13/127 |
| 2017/0137228 A1* | 5/2017 | Kyotani | B65G 35/00 |

\* cited by examiner

CONVEYING EQUIPMENT WITH UTILIZATION OF CONVEYING TRAVELING BODY

FIELD OF THE INVENTION

The present invention relates to conveying equipment with utilization of a conveying traveling body in which a friction drive section is provided in the traveling path of a conveying traveling body.

BACKGROUND OF THE INVENTION

As this type of conveying equipment with utilization of a conveying traveling body, for example, conveying equipment with utilization of a conveying traveling body as described in Japanese unexamined patent application publication No. 2004-331245 (Patent Literature 1) has been known in which a conveying traveling body includes a plurality of trolleys in a traveling direction and a load bar connecting the respective trolleys, in which over a traveling path of the conveying traveling body, a pair of left and right guide rails for supporting and guiding the conveying traveling body are placed and a friction drive section is provided where the conveying traveling body is propelled by a friction drive wheel is pressure-contacted with a side surface of the load bar and in which in each of the trolleys, a pair of left and right supporting rollers fitted to the guide rails and a positioning roller fitted between the pair of left and right guide rails are provided. In the conventional conveying equipment with utilization of a conveying traveling body described in Japanese unexamined patent application publication No. 2004-331245 (Patent Literature 1), the load bar is arranged on the upper side of the pair of left and right guide rails for supporting and guiding the respective trolleys.

SUMMARY OF THE INVENTION

In the conventional conveying equipment with utilization of a conveying traveling body described in Japanese unexamined patent application publication No. 2004-331245 (Patent Literature 1), in a case where a long conveying traveling body which needs, for example, three or more trolleys to be used, since the total length of the load bar needs to have the same length, in all of these trolleys, column members which pass through between the pair of left and right guide rails to protrude upward need to be provided so as to support the load bar, with the result that the number of components is increased. Moreover, since the load bar which needs to be pressure-contacted with the friction drive wheel in the friction drive section is located above the pair of left and right guide rails for supporting and guiding the respective trolleys, when a working floor is placed substantially at the same height as the upper side surfaces of the guide rails, the friction drive wheel and a drive motor therefor are arranged on the working floor, with the result that significantly large installation items are installed on the working floor. In addition, when the drive motor is arranged below the friction drive wheel which is pressure-contacted with the load bar, since the drive motor is arranged outside the pair of left and right guide rails present immediately below the friction drive wheel, in a configuration in which the friction drive wheel is directly attached to the output shaft of the drive motor, a friction drive wheel having a large diameter and a large drive motor that provides a large drive torque so as to drive and rotate the friction drive wheel having a large diameter are needed.

The present invention provides conveying equipment with utilization of a conveying traveling body which can solve the conventional problems described above, and for ease of understanding of a relationship with an embodiment which will be described later, the conveying equipment with utilization of a conveying traveling body according to the present invention will be shown below with reference symbols which are used in the description of the embodiment and which are placed in parentheses. In the conveying equipment with utilization of a conveying traveling body in which a conveying traveling body (1) includes a plurality of trolleys (3 to 5) in a traveling direction and a load bar (6) connecting the respective trolleys (3 to 5), in which over a traveling path of the conveying traveling body (1), a pair of left and right guide rails (8a, 8b) for supporting and guiding the conveying traveling body (1) are placed and a friction drive section (31) is provided where the conveying traveling body (1) is propelled by a friction drive wheel (33) is pressure-contacted with a side surface of the load bar (6) and in which in each of the trolleys (3 to 5), a pair of left and right supporting rollers (9) supported by the pair of left and right guide rails (8a, 8b) and a positioning roller (10) fitted between the pair of left and right guide rails (8a, 8b) are provided, the load bar (6) is arranged immediately below between the pair of left and right guide rails (8a, 8b), and the friction drive wheel (33) in the friction drive section (31) is arranged below the pair of left and right guide rails (8a, 8b).

In the configuration of the present invention, since the friction drive wheel for propelling the conveying traveling body in the friction drive section is arranged at the height of the load bar located below the pair of left and right guide rails, even in a case where the working floor is placed substantially at the same height as the upper side surfaces of the pair of left and right guide rails, the friction drive wheel and the drive motor for driving and rotating the friction drive wheel can be covered with the working floor, with the result that a working area on the working floor is prevented from being narrowed by the friction drive wheel and the drive motor for driving and rotating the friction drive wheel. In addition, for example, the friction drive wheel is directly attached to the output shaft of a speed reducer equipped motor protruding upward, and thus the simplest configuration is achieved, however, since in the friction drive section, unlike the conventional configuration, the pair of left and right guide rails are not present below the load bar located at the same height as the friction drive wheel, the speed reducer equipped motor can be arranged so as to be close to the moving path of the load bar in plan view. In other words, the interval between the output shaft of the speed reducer equipped motor protruding upward and the side surface of the load bar can be sufficiently narrowed, and thus it is possible to use the friction drive wheel having a small diameter. As described above, since the friction drive wheel having a small diameter can be used, as compared with a case where the friction drive wheel having a large diameter is used, a drive torque necessary for the speed reducer equipped motor is reduced, with the result that it is possible to reduce the cost necessary in the friction drive section as a whole.

Specifically, in a case where the present invention is practiced, the load bar (6) can be formed with: intermediate long load bar units (14, 15) whose both ends are coupled to the two trolleys (3 to 5) adjacent in forward and backward directions such that the intermediate long load bar units (14, 15) freely swing horizontally around vertical axes (3a to 5a);

and end portion load bar units (16, 17) which are provided integrally with the front and rear trolleys (4, 5) at both ends. In this configuration, in a case where in a horizontal turning path portion, the conveying traveling bodies adjacent in the forward and backward directions abut against each other, since the load bars of these conveying traveling bodies are brought into a state where the end portion load bar units integral with the trolleys located at the end portions abut against each other, even when the horizontal turning path portion has a relatively small turning radius, it is possible to provide the push/press drive smoothly and without difficulty.

In this case, the following configuration can be provided: as the trolleys, two front and rear load trolleys (3, 4) and one free trolley (5) are provided, in the two front and rear load trolleys (3, 4), column members (11, 12) are provided which pass through between the pair of left and right guide rails (8a, 8b) to protrude upward, on a horizontal coupling member (13) which connects upper end portions of the pair of front and rear column members (11, 12), a conveyed object supporting portion (2) is provided and in the intermediate long load bar unit (15) whose one end is coupled to the free trolley (5) of the two intermediate long load bar units (14, 15), a joint portion (15a) which freely bends around a horizontal support shaft in an up/down direction is provided close to an end portion on a side of the load trolley (3). In this configuration, since the conveyed object can be supported by the two front and rear load trolleys, even a heavy weight conveyed object can be stably supported, and the load placed on the load trolley can be halved, with the result that it is possible to use small-sized load trolleys. It is a matter of course that, for a lightweight conveyed object, a column member which passes through between the pair of left and right guide rails so as to protrude upward from one load trolley is provided, and thus a conveyed object support base can be supported by the one column member. In this case, the conveying traveling body can be formed with one load trolley which supports the conveyed object and one free trolley which is coupled to the one load trolley via the load bar.

In each of the trolleys (3 to 5), two front and rear pairs of left and right positioning rollers (10) can be provided so as to be adjacent to inner sides of the pair of left and right guide rails (8a, 8b). In this configuration, since the interval between the pair of left and right guide rails can be easily widened, in a case where the conveyed object is supported via a support column which passes through between the pair of left and right guide rails so as to protrude upward, it is possible to convey the conveyed object stably and safely without use of another guide rail and another roller for reducing the swinging of the conveyed object in the left/right lateral direction.

Furthermore, in a place where the conveying traveling body (1) in a free state which does not receive a propulsion force is positioned in the traveling path, a lock means (49) is provided which locks the conveying traveling body (1) such that the conveying traveling body (1) is prevented from moving forward and backward. The lock means (49) can be formed with: a pair of front and rear lock levers (29a, 29b) which freely open and close and which sandwich, from both sides in the forward and backward directions, a portion (3b) of the one trolley (3) of the plurality of trolleys (3 to 5) that is below the pair of left and right guide rails (8a, 8b) and above the load bar (6); and a drive means (cylinder unit (51)) which drives the pair of front and rear lock levers (29a, 29b) so as to open and close the pair of front and rear lock levers (29a, 29b). In this case, the trolley sandwiched between the lock levers is preferably a load trolley (in a case where a plurality of load trolleys are present, one of them) which supports the conveyed object. Since the positioning roller which is fitted between the pair of left and right guide rails to position the trolley is protruded from the guide rails in an up/down direction, the positioning roller is configured so as to be fitted between the inner sides on the upper sides of the pair of left and right guide rails, and thus the positioning roller is prevented from protruding to the lower side of the guide rails on the side where the lock lever is present, with the result that the lock lever can be arranged so as to be close to immediately below the pair of left and right guide rails.

In the traveling path of the conveying traveling body (1), not only the friction drive section (31) but also a chain drive section (39) in which the conveying traveling body (1) is propelled by a pusher (25) of a drive chain (24) can be provided. In this case, although a driven dog (7) with which the pusher (25) is engaged is needed for the conveying traveling body (1), the driven dog (7) can be provided below the load bar (6). In other words, since unlike the conventional configuration where the driven dog is provided in one specific trolley of a plurality of trolleys in the conveying traveling body, the driven dog is provided in the load bar, the same structure can be achieved for all of the plurality of trolleys required for one conveying traveling body, in which the load bar can be attached below the respective trolleys, and thus unlike the conventional configuration, it is not necessary to provide two types of trolleys whose cost is higher than the load bar, that is, the trolley to which the driven dog is attached and the trolley to which the driven dog is not attached, with the result that the present invention can be easily practiced at low cost. Furthermore, in this case, the driven dog (7) is preferably provided below any one of the two front and rear end portion load bar units (16, 17) fixed integrally with the trolleys (4, 5) at both ends of the conveying traveling body (1) in the forward and backward directions at both ends of the load bar (6).

DETAILED DESCRIPTION OF INVENTION

Figure 1:
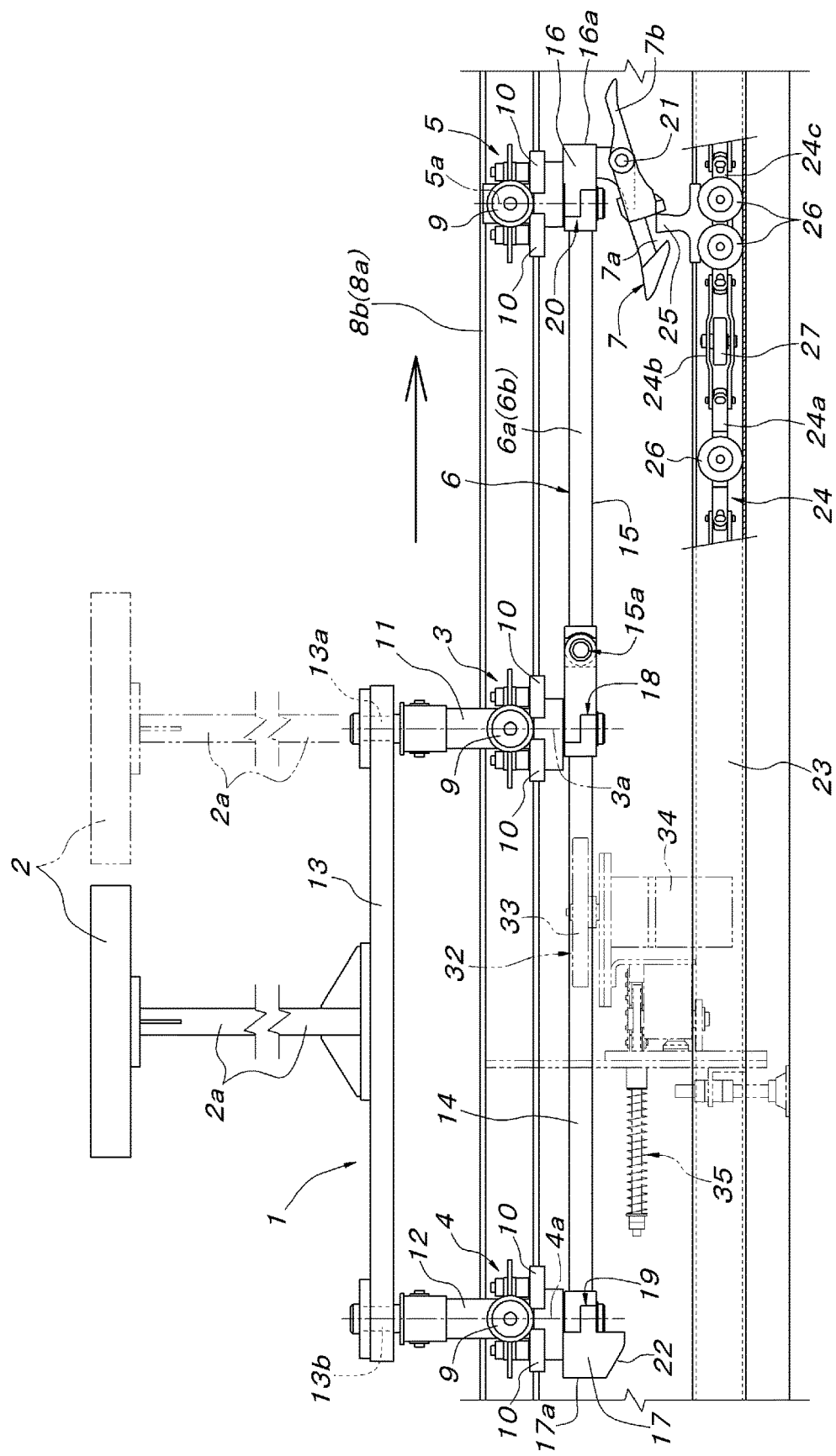
FIG. 1 is a partial cutaway side view showing a conveying traveling body which is driven in a chain drive section and a drive chain with a pusher.

In an embodiment of the present invention which will be described below, a layout is designed in which both a friction drive section and a chain drive section are provided in the traveling path of a conveying traveling body. In FIGS. 1 to 4, a conveying traveling body 1 according to this embodiment is formed with: two front and rear load trolleys 3 and 4 which support a conveyed object supporting portion 2; a headmost free trolley 5 which is positioned in front of the front-side load trolley 3; a load bar 6 which couples these three front and rear trolleys 3 to 5; and a driven dog 7 which is provided on the lower side of the front end of the load bar 6. Over the traveling path of the conveying traveling body 1, a pair of right and left guide rails 8a and 8b which support and guide the three front and rear trolleys 3 to 5 are placed. Both of these guide rails 8a and 8b are formed by aligning two pieces of channel steel a given distance apart with the groove portions thereof open inward. Moreover, when the conveying traveling body 1 is seen in side view, the conveyed object supporting portion 2 is located above the guide rails 8a and 8b, and the load bar 6 is located immediately below the guide rails 8a and 8b.

The three front and rear trolleys 3 to 5 each have the same structure and include: a pair of left and right supporting rollers 9 which are pivotally supported by a concentric horizontal support shaft so as to be respectively engaged with the pair of left and right guide rails 8a and 8b; and two front and rear pairs of left and right positioning rollers 10 which are engaged between the lower sides of the pair of left and right guide rails 8a and 8b and which are individually and pivotally supported by vertical support shafts. In the two front and rear load trolleys 3 and 4, column members 11 and 12 whose main bodies are extended vertically upward and pass through between the pair of left and right guide rails 8a and 8b are provided, both end portions of a horizontal coupling member 13 which couples the pair of front and rear column members 11 and 12 are respectively and pivotally supported on the upper sides of the pair of front and rear column members 11 and 12 by vertical support shafts 13a and 13b such that they freely swing horizontally and on the upper side of the intermediate portion of the horizontal coupling member 13, via a columnar member 2a, the conveyed object supporting portion 2 is supported.

The load bar 6 is formed with: a rear-side intermediate long load bar unit 14 which connects the two front and rear load trolleys 3 and 4; a front-side intermediate long load bar unit 15 which connects the front-side load trolley 3 and the headmost free trolley 5; and end portion load bar units 16 and 17 which are respectively fixed to the lower sides of the front and rear trolleys 4 and 5 at both ends. In the front-side intermediate long load bar unit 15, in a position which is close to the front-side load trolley 3, a vertical motion joint portion 15a which relatively rotates freely around the horizontal support shaft is provided. Both the front and rear intermediate long load bar units 14 and 15 are coupled to the lower sides of the respective load trolleys 3 to 5 via lateral motion joint portions 18 to 20 which relatively rotate freely around vertical axes 3a to 5a passing through center positions between the pair of left and right supporting rollers 9 in the respective trolleys 3 to 5. The load bar 6 formed with these four joint portions 15a and 18 to 20 and the load bar units 14 to 17 is configured such that when the conveying traveling body 1 is in the linear traveling path, the load bar 6 is formed in the shape of a prism parallel to the traveling path and having a given width, and both left and right side surfaces which are linearly continuous vertical surfaces are friction drive surfaces 6a and 6b.

The end portion load bar units 16 and 17 located at both ends of the front and rear of the load bar 6 include protruding curved arc surfaces 16a and 17a which are brought into linear contact with each other when the conveying traveling bodies 1 are adjacent to each other in the forward and backward directions. The driven dog 7 is pivotally supported by a horizontal support shaft 21 on the lower side of the end portion load bar unit 16 integral with the headmost free trolley 5 so as to freely perform a seesaw movement within a given range; the driven dog 7 is held by gravity in an action posture shown in FIG. 1 in which its end is downward; in the lower side of the rear side (back half portion) with respect to the horizontal support shaft 21, a pusher engagement concave portion 7a which is open downward is formed; and in the front side (front half portion) with respect to the horizontal support shaft 21, an operated lever portion 7b which extends forward is formed. In the lower side of the end portion load bar unit 17 fixed to the lower side of the rear-side load trolley 4, as indicated by imaginary lines in FIG. 2B, a cam portion 22 is integrally formed which moves up the driven dog 7 of the following conveying traveling body 1 via the operated lever portion 7b so as to switch to a horizontal non-action posture.

Figure 4:
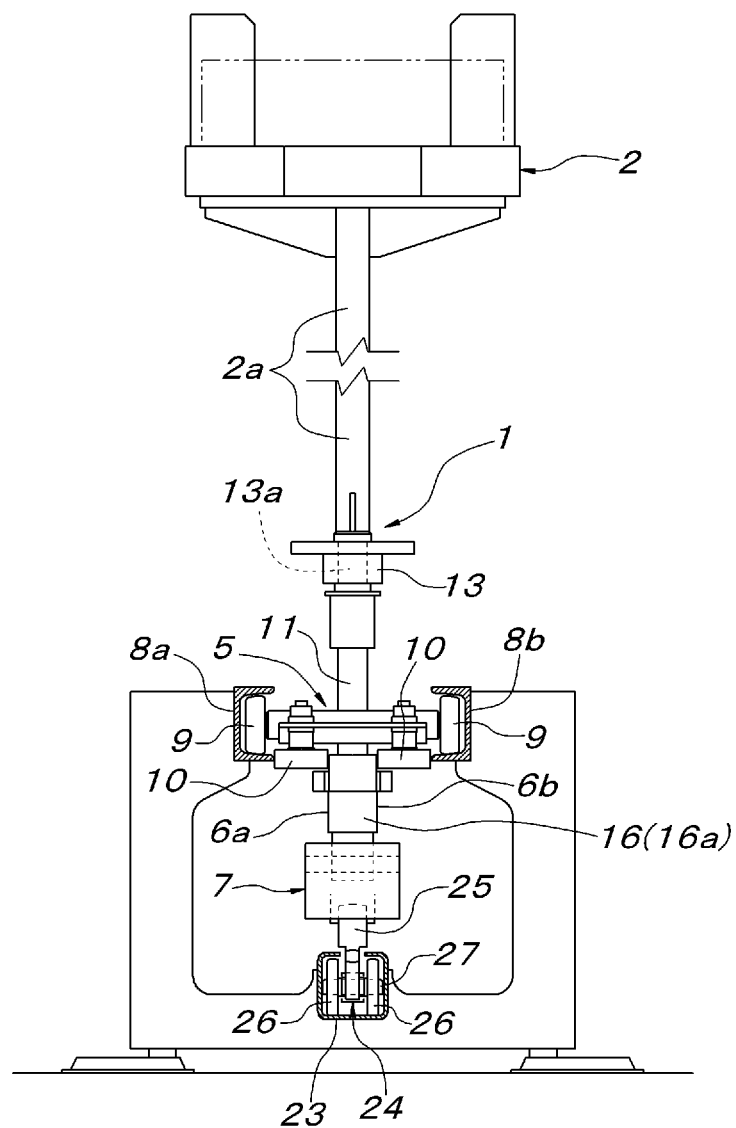
FIG. 4 is a partial cutaway front view of FIG. 1.

Over the chain drive section in which the conveying traveling body 1 is chain-driven, as shown in FIGS. 1 and 4, one rectangular cylindrical guide rail 23 located below (naturally below the moving path of the load bar 6 and the driven dog 7) the center position between the pair of left and right guide rails 8a and 8b is placed, and in a drive chain 24 which moves within the rectangular cylindrical guide rail 23, pushers 25 are provided an appropriate distance apart so as to protrude upward from a slit-shaped opening portion in the center of the upper side of the rectangular cylindrical guide rail 23. The drive chain 24 is a conventional known drive chain in which a chain link 24a where a pair of left and right supporting rollers 26 are pivotally supported by a common horizontal support shaft and a chain link 24b where one positioning roller 27 is pivotally supported by a vertical support shaft are alternately coupled with a cross pin such that the drive chain 24 and the chain link 24b can be curved both in a horizontal direction and in a vertical direction. With respect to the pusher 25, the pair of left and right supporting rollers 26 are attached to two front and rear pairs of drive chains 24c, and the upper end of the pusher 25 enters upward into the moving path of the pusher engagement concave portion 7a of the driven dog 7 in the action posture in which its end is downward.

Figure 2A:
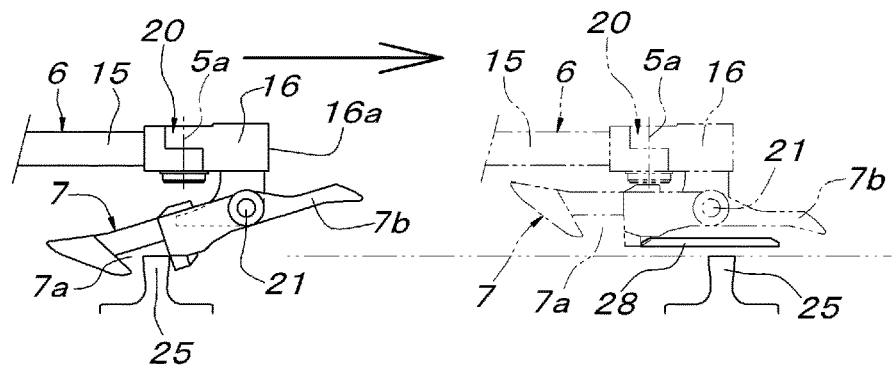
FIG. 2A is a side view of a main portion for illustrating action produced when the conveying traveling body driven in the chain drive section is stopped at a fixed position.

When the conveying traveling body 1 enters the chain drive section, the pusher 25 of the drive chain 24 which is driven to move within the rectangular cylindrical guide rail 23 pushes up the rear end portion of the driven dog 7 to enter the pusher engagement concave portion 7a of the driven dog 7b, and thus the conveying traveling body 1 is made to travel forward via the driven dog 7. In the chain drive section, in a fixed position where the conveying traveling body 1 is stopped, as shown in FIG. 2A, a stopper plate 28 which pushes up the back half portion of the driven dog 7 to switch the driven dog 7 to the horizontal non-action posture is arranged so as to be advanceable and retractable in the horizontal direction perpendicular to the moving path of the driven dog 7. The stopper plate 28 which has switched the driven dog 7 to the horizontal non-action posture is engaged with a step portion formed in a position immediately in front of the pusher engagement concave portion 7a of the driven dog 7, and thus the conveying traveling body 1 is stopped at the fixed position. In this state, the driven dog 7 and the stopper plate 28 are located upward away from the moving path of the pusher 25.

Figure 2B:
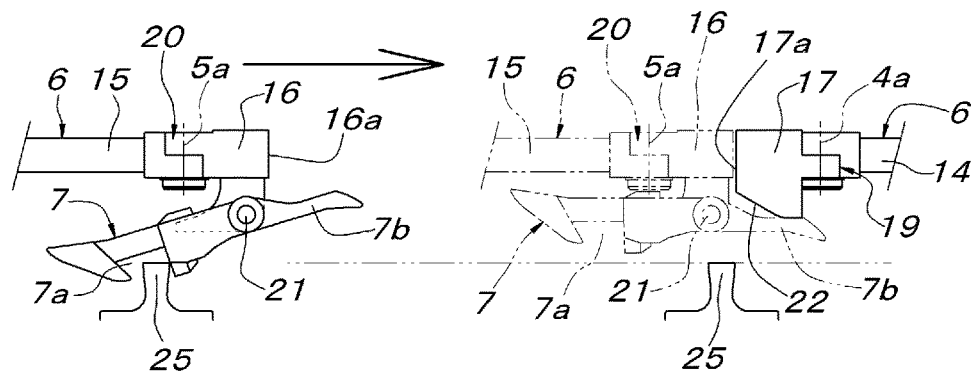
FIG. 2B is a side view of the main portion for illustrating action produced when the conveying traveling body driven in the chain drive section is automatically stopped in a state where it is connected to a conveying traveling body at rest.

When the conveying traveling body 1 is stopped at the fixed position where the stopper plate 28 is provided as described above, the conveying traveling body 1 which is driven to move forward by the following pusher 25 collides against the front-side conveying traveling body 1 which is stopped. However at this time, as shown in FIG. 2B, since the cam portion 22 located on the lower side of the rear end of the load bar 6 of the front-side conveying traveling body 1 which is stopped pushes down, from above to below, the operated lever portion 7b of the driven dog 7 at the front end of the conveying traveling body 1 which moves to approach, the driven dog 7 is switched to the horizontal non-action posture. Consequently, in a state where the driven dog 7 is disengaged from the pusher 25 and where the conveying traveling body 1 which moves to approach does not receive a propulsion force, the protruding curved arc surface 16a at the front end of the load bar 6 makes contact with the protruding curved arc surface 17a at the rear end of the load bar 6 of the front-side conveying traveling body 1 which is stopped. By this action, with the fixed position where the stopper plate 28 is provided at the head, the following conveying traveling bodies 1 are automatically stopped one after another and can be stored. When the conveying traveling bodies 1 which are stored are again moved forward with the pusher 25 of the drive chain 24, the stopper plate 28 is moved and retreated laterally, and thus the driven dog 7 of the headmost conveying traveling body 1 is restored to the original action posture.

Figure 2C:
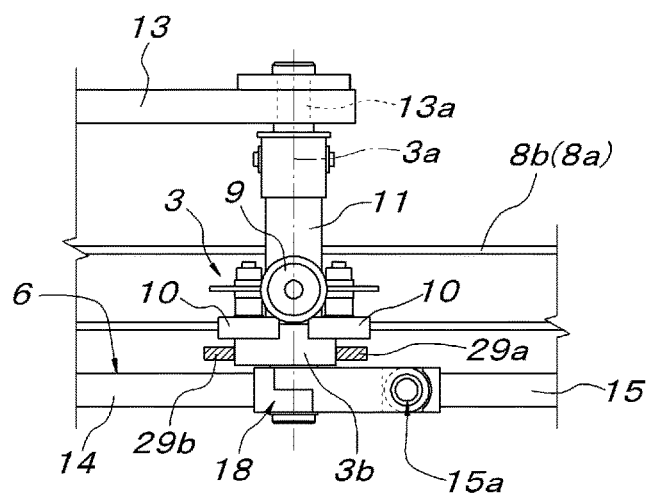
FIG. 2C is a side view of the main portion for illustrating a state where the conveying traveling body which is stopped at the fixed position is positioned with a lock means.
Figure 3:
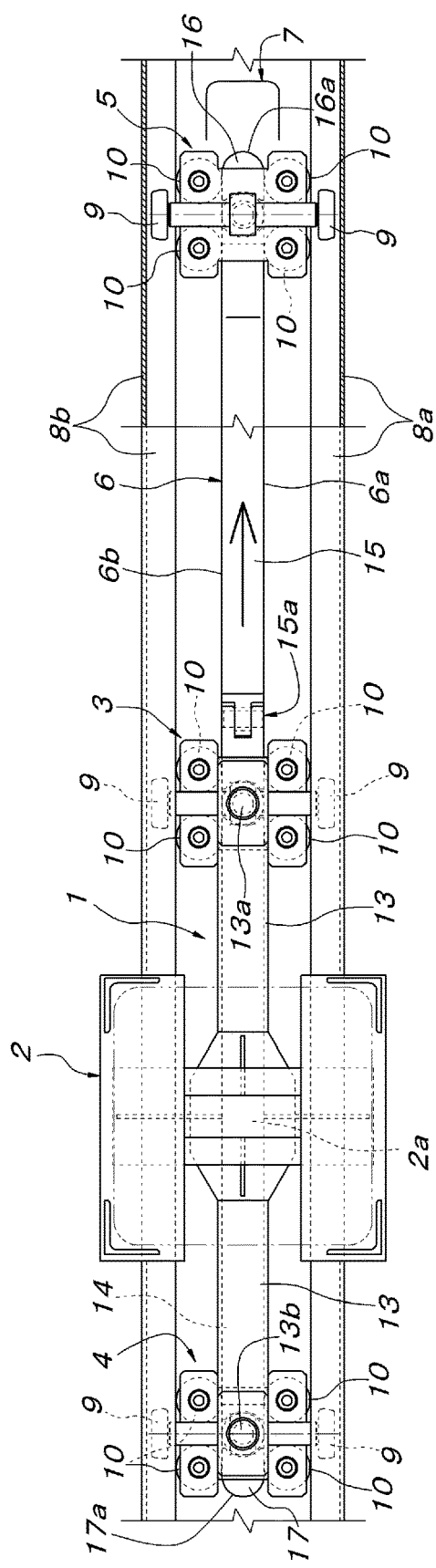
FIG. 3 is a partial cutaway plan view of FIG. 1.

As described above, when the conveying traveling body 1 is stopped at the fixed position with the stopper plate 28, since the conveying traveling body 1 is prevented from moving forward with the stopper plate 28 but can freely move backward away from the stopper plate 28, in a case where, for example, the loading and unloading of a conveyed object on the conveyed object supporting portion 2 is performed on the conveying traveling body 1 which is stopped at the fixed position, the conveying traveling body 1 can be locked in the fixed position such that the conveying traveling body 1 cannot freely move in any of the forward and backward directions. Although a specific structure will be described later, as a lock means for locking the conveying traveling body 1 in the fixed position, as shown in FIG. 2C, a lock means can be utilized in which in one of the trolleys 3 to 5 included in the conveying traveling body 1, for example, the front-side load trolley 3, a portion 3b located at an intermediate height between the guide rails 8a and 8b and the load bar 6 in side view is positioned by sandwiching the portion 3b between a pair of front and rear lock levers 29a and 29b.

Figure 6A:
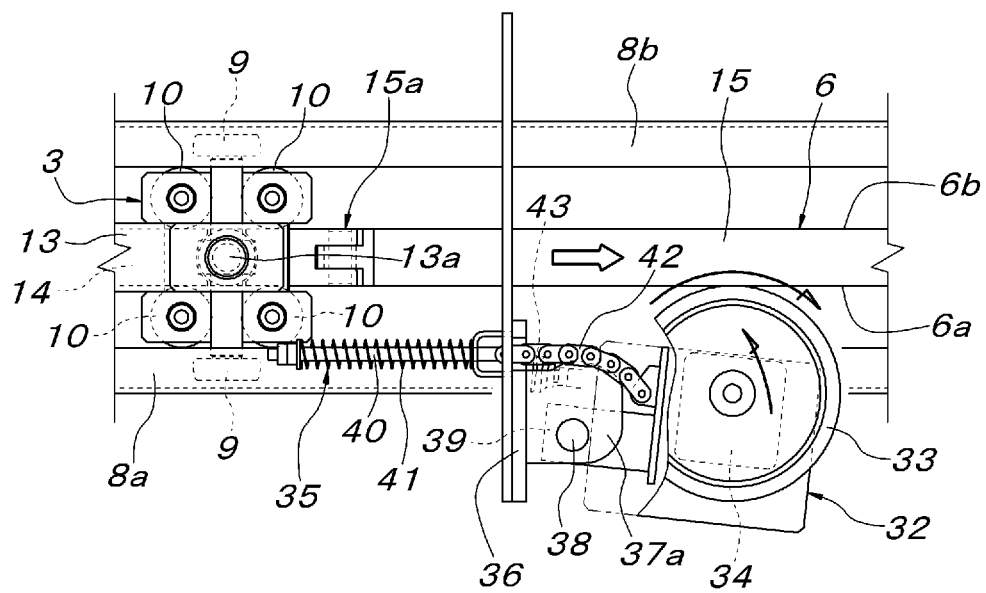
FIG. 6A is a partial cutaway plan view showing a friction drive means used in a friction drive section.
Figure 6B:
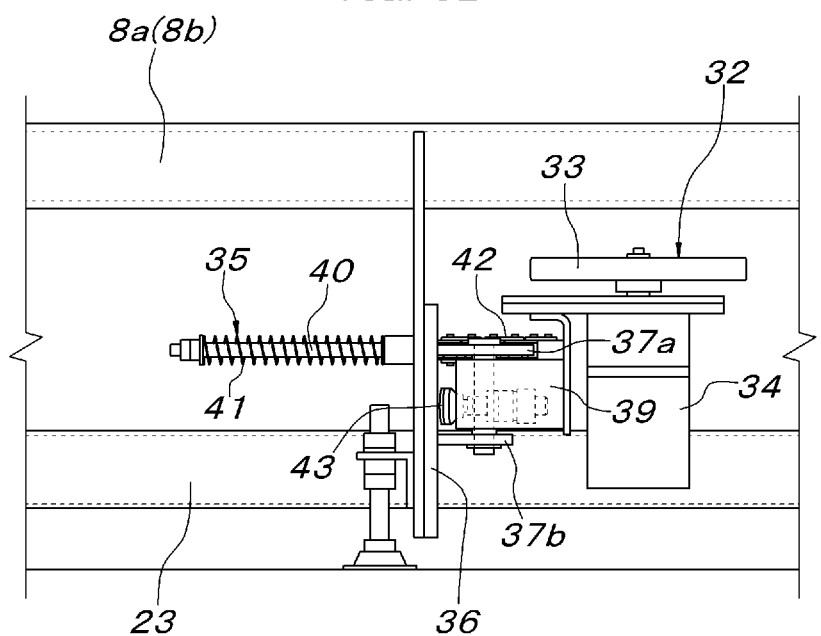
FIG. 6B is a side view thereof.
Figure 7:
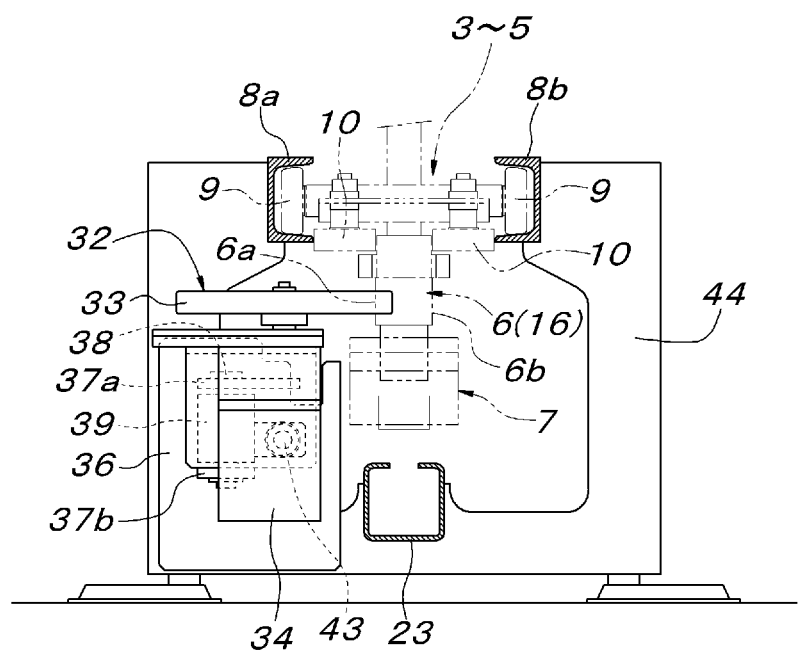
FIG. 7 is a vertical cross-sectional front view showing the installation place of the friction drive means in the friction drive section.

An example of the layout of conveying equipment according to the present invention will be described with reference to FIG. 5. In the circulation traveling path of the conveying traveling body 1, a chain drive section 30 where the above-described drive chain 24 is provided and a friction drive section 31 are set. In the friction drive section 31, friction drive means 32 are arranged, along the traveling path of the conveying traveling body 1, at intervals which are not longer than the total length of the load bar 6. As shown in FIGS. 6A to 7, the friction drive means 32 is formed with: a friction drive wheel 33; a speed reducer equipped motor 34 which rotates and drives the friction drive wheel 33; and an urging means 35 for bringing the friction drive wheel 33 into pressure-contact with one side of the friction drive surfaces 6a and 6b of the load bar 6 of the conveying traveling body 1. The speed reducer equipped motor 34 in which the friction drive wheel 33 is attached to an output shaft protruding upward is attached, between a pair of upper and lower bearing plates 37a and 37b which are provided to protrude from a vertical base plate 36, to a movable base 39 which is pivotally supported with a vertical support shaft 38 so as to freely swing horizontally around the vertical support shaft 38. The urging means 35 is formed with: a movable rod 40 which is supported so as to freely move in the horizontal direction perpendicular to the vertical base plate 36; a compression coil spring 41 which urges the movable rod 40 in a direction away from the vertical base plate 36; a transmission chain 42 in which one end is locked to an inner end of the movable rod 40 and in which the other end is locked to the movable base 39. The transmission chain 42 between the inner end of the movable rod 40 and the movable base 39 is stretched along a chain guide arc surface on the upper bearing plate 37a which is formed concentrically with the vertical support shaft 38, and on the movable base 39, a stopper 43 is provided which restricts the movement limit of the friction drive wheel 33 that moves to the side of the moving path of the load bar 6 of the conveying traveling body 1 by the urging force of the urging means 35 to a position where the load bar 6 can enter the inside of the friction drive means 32 by making contact with the vertical base plate 36 and thereby pushing out the friction drive means 32.

In the configuration described above, as shown in FIG. 7, the friction drive wheel 33 at the same height as the load bar 6 is located on the lower side of the one-side guide rail 8a of the pair of left and right guide rails 8a and 8b located on the upper side with respect to the load bar 6, and the speed reducer equipped motor 34 in which the friction drive wheel 33 is attached to the output shaft protruding upward can be arranged so as to approach the flank of the moving path of the driven dog 7 provided on the lower side of the tip end of the load bar. The vertical base plate 36 of the friction drive means 32 can be attached to a rail support member 44 which supports the pair of left and right guide rails 8a and 8b, the rectangular cylindrical guide rail 23 for guiding the drive chain 24 and the like.

Figure 5:
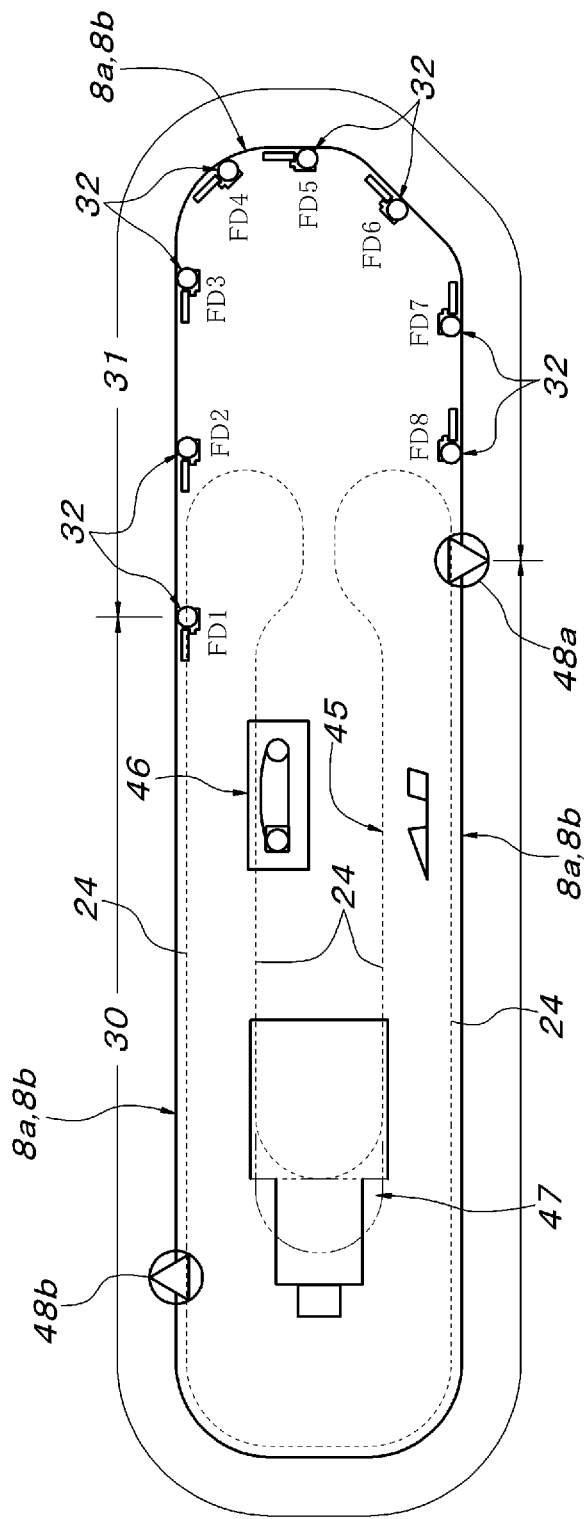
FIG. 5 is a plan view showing an example of the layout of an entire conveying device.

In the layout shown in FIG. 5, the drive chain 24 which is stretched so as to rotate along the chain drive section 30 is driven by a drive means 46 in a return path portion 45 ranging from the terminal end to the beginning end of the chain drive section 30, and is tensioned by a take-up means 47 such that an appropriate tension is maintained. Within the chain drive section 30, fixed stop positions 48a and 48b in which the stopper plate 28 shown in FIG. 2A is provided are set. The friction drive wheel 33 which is driven to rotate by the speed reducer equipped motor 34 of the friction drive means 32 is pressure contacted with the friction drive surface 6a of the load bar 6, and thus the conveying traveling body 1 fed out from the terminal end of the chain drive section 30 to the friction drive section 31 travels in the friction drive section 31 at the circumferential speed of the friction drive wheel 33. The friction drive means 32 is arranged at intervals which are not longer than the total length of the load bar 6, and thus one friction drive wheel 33 of the friction drive means 32 is constantly pressure contacted with load bar 6 of the conveying traveling body 1, with the result that in the friction drive section 31, unless the speed reducer equipped motor 34 of the friction drive means 32 is controlled, the respective conveying traveling bodies 1 continuously travel at a constant speed while keeping a predetermined interval.

The conveying traveling body 1 which is driven by the pusher 25 of the drive chain 24 in the chain drive section 30 can be automatically stopped at the respective fixed stop positions 48a and 48b with the stopper plate 28 such as for the loading and unloading of a conveyed object, and a specific example of the lock means in a case where as described with reference to FIG. 2C, the conveying traveling body 1 which is automatically stopped at the fixed stop positions 48a and 48b with the stopper plate 28 is locked with the pair of front and rear lock levers 29a and 29b so as not to freely move forward and backward will be described with reference to FIGS. 8 and 9. One lock lever 29a of the pair of front and rear lock levers 29a and 29b which are respectively and pivotally supported with vertical support shafts 50a and 50b so as to freely swing around the vertical support shafts 50a and 50b is directly driven by being pushed and pulled with a cylinder unit 51, and thus the illustrated lock means 49 is switched between a retract posture parallel to the traveling path of the conveying traveling body 1 shown in FIG. 8A and an action posture perpendicular to the traveling path of the conveying traveling body 1 shown in FIG. 8B. The other lock lever 29b is coupled in an interlocking manner to the one lock lever 29a with a link 52 whose both ends are pivotally supported with vertical support shafts 52a and 52b to the eccentric position of the base portion of the other lock lever 29b and the eccentric position of the base portion of the one lock lever 29a.

Figure 8A:
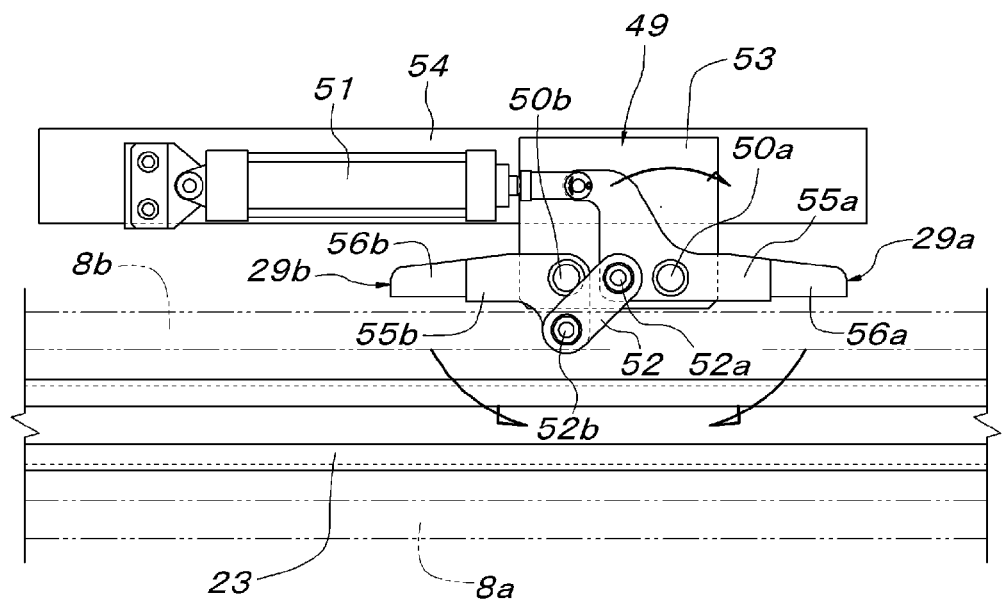
FIG. 8A is a plan view showing a standby state of the lock means in the conveying traveling body.
Figure 8B:
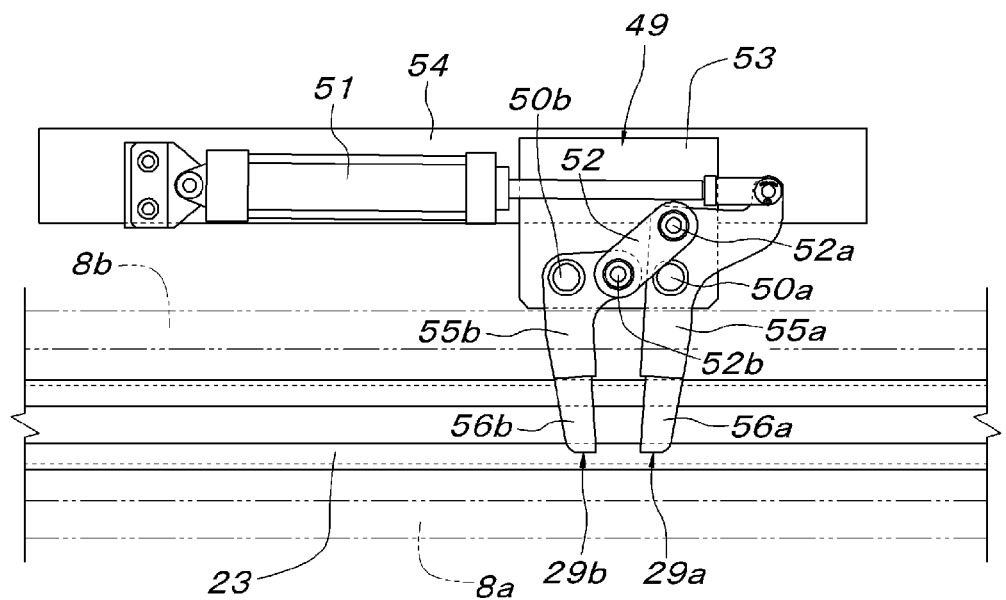
FIG. 8B is a plan view showing a lock action state of the lock means.
Figure 9:
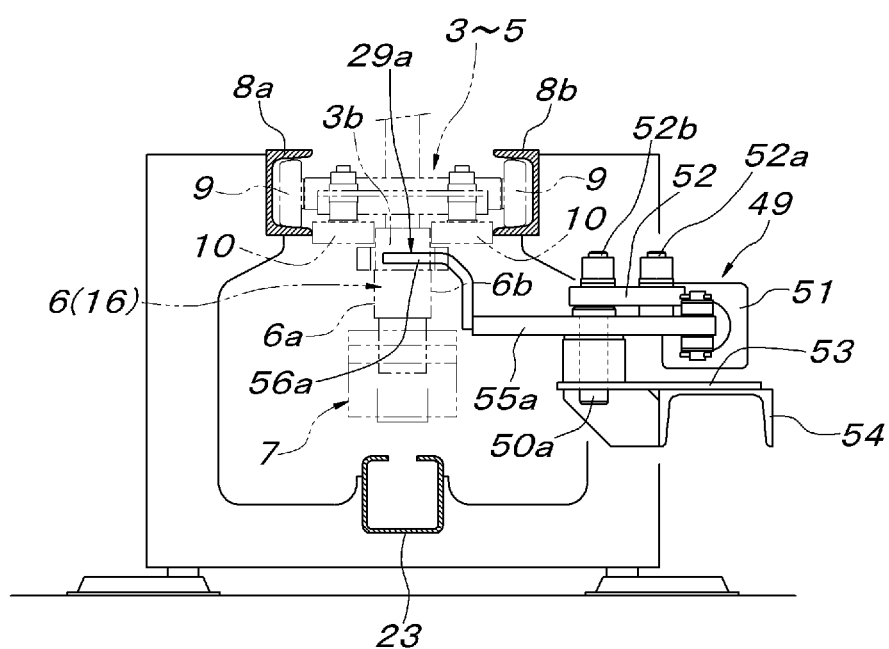
FIG. 9 is a front view of FIG. 8B.

In this configuration, when the one lock lever 29a is brought into the retract posture, the other lock lever 29b is pushed by the link 52 in a direction away from the one lock lever 29a, and is switched, as shown in FIG. 8A, to the retract posture which is symmetric in the forward and backward directions with the retract posture of the one lock lever 29a whereas when the one lock lever 29a is brought into the action posture, the other lock lever 29b is pulled by the link 52 in a direction approaching the one lock lever 29a, and is switched, as shown in FIG. 8B, to the action posture which is symmetric in the forward and backward directions with the action posture of the one lock lever 29a.

As described above, in the lock means 49, the pair of front and rear lock levers 29a and 29b are switched, by control of the one cylinder unit 51, to the action posture in which the position immediately below the guide rails 8a and 8b of the front-side load trolley 3 in the conveying traveling body 1 is sandwiched in the forward and backward directions, and thus the conveying traveling body 1 is locked in the fixed position whereas when the conveying traveling body 1 is made to travel again from the fixed position, before the retreat of the stopper plate 28, the pair of front and rear lock levers 29a and 29b are switched to the non-action posture, and thus it is possible to release the locking of the conveying traveling body 1. In this lock means 49, as shown in FIG. 9, below the one-side guide rail of the guide rails 8a and 8b, for example, the guide rail 8b, a base 54 is arranged which supports a bearing plate 53 for pivotally supporting the pair of front and rear lock levers 29a and 29b and the cylinder unit 51 and which is aligned with the traveling path of the conveying traveling body 1. Therefore, the pair of front and rear lock levers 29a and 29b are configured such that at the tip end of horizontal lever main bodies 55a and 55b pivotally supported with the vertical support shafts 50a and 50b, gripping plates 56a and 56b are provided which sandwich the front-side load trolley 3 of the conveying traveling body 1 in a position higher than the lever main bodies 55a and 55b and which are bent in the shape of an inverted L shape.

In the conveying equipment configured as described above, the conveying traveling body 1 which travels along the chain drive section 30 and the friction drive section 31 is stopped at the fixed stop positions 48a and 48b set in the chain drive section 30, and as necessary, in a state where the conveying traveling body 1 is locked with the lock means 49, it is possible to load the conveyed object on the conveyed object supporting portion 2 or unload the conveyed object from the conveyed object supporting portion 2 or to perform predetermined work on the conveyed object on the conveyed object supporting portion 2. Although in order for this work to be easily performed by an operator standing on a working floor placed substantially at the same height as the upper surfaces of the pair of left and right guide rails 8a and 8b, as shown in FIG. 4, the columnar member 2a provided to stand on the horizontal coupling member 13 of the conveying traveling body 1 is made longer, and thus the height of the conveyed object supporting portion 2 can be increased, however, in this case, it can be considered that the conveyed object supporting portion 2 may swing in the left/right lateral direction. However, since each of the trolleys 3 to 5 has a structure in which the two front and rear pairs of left and right positioning rollers 10 are adjacent to the inner sides of each pair of left and right guide rails 8a and 8b and in which it is possible to sufficiently increase the intervals between the pair of left and right supporting rollers 9, it is possible to minimize the swinging of the conveyed object supporting portion 2 in the left/right lateral direction without adding any special swinging prevention means.

The conveying equipment with utilization of a conveying traveling body according to the present invention can be utilized as conveying equipment in which in the traveling path of the conveying traveling body, the friction drive section and the chain drive section are provided.

What is claimed is:

1. Conveying equipment comprising:
    a conveying traveling body having a plurality of trolleys in a traveling direction and a load bar connecting the respective trolleys;
    a pair of left and right guide rails for supporting and guiding the conveying traveling body disposed over a traveling path of the conveying traveling body;
    a friction drive section to propel the conveying traveling body, the friction drive section having a friction drive wheel operable to pressure-contact with a side surface of the load bar;
    each of the trolleys having a pair of left and right supporting rollers supported by the pair of left and right guide rails and a positioning roller fitted between the pair of left and right guide rails;
    the load bar being arranged immediately below and between the pair of left and right guide rails, and the friction drive wheel in the friction drive section being arranged below the pair of left and right guide rails;
    the plurality of trolleys including front and rear load trolleys and a free trolley, the front and rear load trolleys each having a column member protruding upward and passing between the pair of left and right guide rails;
    a horizontal coupling member connecting upper end portions of the column members, and a conveyed object supporting portion on the coupling member;
    the load bar including intermediate long load bar units coupled to two trolleys adjacent in forward and backward directions, and the intermediate long load bar units being operable to freely swing horizontally around vertical axes, and the load bar including end portion load bar units provided integrally with the free trolley and the rear load trolley;

one of the intermediate long load bar units has a first end coupled to the free trolley, a second end coupled to the front load trolley, and a joint portion disposed adjacent the second end, and the joint portion is operable to freely bend around a horizontal support shaft in an up/down direction.

2. The conveying equipment according to claim 1, wherein in each of the trolleys, two front and rear pairs of left and right positioning rollers are provided adjacent to inner sides of the pair of left and right guide rails.

3. The conveying equipment according to claim 1, wherein:

a chain drive section is disposed in the traveling path of the conveying traveling body, the conveying traveling body is propelled by a pusher of a drive chain in the chain drive section and the pusher moves below the load bar; and a driven dog is provided below the load bar and is freely engaged and disengaged with the pusher.

4. The conveying equipment according to claim 3, wherein:

the load bar includes intermediate long load bar units coupled to two trolleys adjacent in forward and backward directions, and the intermediate long load bar units are operable to freely swing horizontally around vertical axes; and the load bar includes end portion load bar units provided integrally with the free trolley and the rear trolley, and the driven dog is provided below one of the two end portion load bar units.

5. Conveying equipment comprising:

a conveying traveling body having a plurality of trolleys in a traveling direction and a load bar connecting the respective trolleys;

a pair of left and right guide rails for supporting and guiding the conveying traveling body disposed over a traveling path of the conveying traveling body;

a friction drive section to propel the conveying traveling body, the friction drive section having a friction drive wheel operable to pressure-contact with a side surface of the load bar;

each of the trolleys having a pair of left and right supporting rollers supported by the pair of left and right guide rails and a positioning roller fitted between the pair of left and right guide rails;

the load bar being arranged immediately below and between the pair of left and right guide rails, and the friction drive wheel in the friction drive section being arranged below the pair of left and right guide rails;

a lock means disposed in the traveling path of the conveying traveling body, the lock means being operable to lock the conveying traveling body such that the conveying traveling body is prevented from moving forward and backward, and the lock means includes a pair of front and rear lock levers which freely open and close, the pair of front and rear lock levers being operable to sandwich, from both sides in forward and backward directions, a portion of one trolley of the plurality of trolleys, where the portion of the one trolley is below the pair of left and right guide rails and above the load bar; and a drive means which drives the pair of front and rear lock levers so as to open and close the pair of front and rear lock levers.

6. The conveying equipment according to claim 5, wherein:

in each of the trolleys, two front and rear pairs of left and right positioning rollers are provided adjacent to inner sides of the pair of left and right guide rails.

7. The conveying equipment according to claim 5, wherein:

a chain drive section is disposed in the traveling path of the conveying traveling body, the conveying traveling body is propelled by a pusher of a drive chain in the chain drive section and the pusher moves below the load bar; and a driven dog is provided below the load bar and is freely engaged and disengaged with the pusher.

8. The conveying equipment according to claim 7, wherein:

the load bar includes intermediate long load bar units coupled to two trolleys adjacent in forward and backward directions, and the intermediate long load bar units are operable to freely swing horizontally around vertical axes; and the load bar includes end portion load bar units provided integrally with the free trolley and the rear trolley, and the driven dog is provided below one of the two end portion load bar units.

* * * * *